United States Patent [19]

Harvey et al.

[11] Patent Number: 4,732,689
[45] Date of Patent: Mar. 22, 1988

[54] FEEDER ASSEMBLY FOR ADDING DISSOLVABLE AGENT TO A FLOWING LIQUID

[75] Inventors: Donald J. Harvey; Richard J. Coin, both of Mentor; Homer L. Turley, Painesville; Bonnie I. Nelson, Mentor, all of Ohio

[73] Assignee: ELTECH Systems Corporation, Boca Raton, Fla.

[21] Appl. No.: 835,391

[22] Filed: Mar. 3, 1986

[51] Int. Cl.$^4$ .................. C02F 1/76; E04H 3/20
[52] U.S. Cl. ..................... 210/754; 210/169; 210/205; 422/33; 422/37; 422/274; 422/283
[58] Field of Search .......... 210/169, 192, 198.1, 210/205, 206, 749, 754–756, 764; 422/266, 274, 283, 33, 37

[56] References Cited

U.S. PATENT DOCUMENTS

| | | | |
|---|---|---|---|
| 3,595,786 | 7/1971 | Horvath et al. | 210/98 |
| 3,864,090 | 2/1975 | Richards | 422/274 X |
| 4,260,587 | 4/1981 | Braden | 210/169 X |
| 4,293,425 | 10/1981 | Price | 210/754 |
| 4,303,515 | 12/1981 | Rademacher | 422/283 X |
| 4,338,191 | 7/1982 | Jordan | 210/199 |
| 4,420,394 | 12/1983 | Lewis | 422/266 X |

Primary Examiner—Tom Wyse
Attorney, Agent, or Firm—John J. Freer

[57] ABSTRACT

A pressure feeder for controlled addition of dissolvable agent into a flowing liquid has been designed which provides constant concentration of the agent in the treated liquid. This concentration is independent from the flow rate and the pressure of the liquid and also slugging of the agent at zero flow rate is avoided. A feeder according to the invention comprises a dissolution chamber connectable to a point of slightly increased pressure in the main circuit in which dissolution chamber the liquid is brought in controlled contact with stacked tablets of the agent. A linear weir controls the height of the liquid level in the dissolution chamber such that is proportional to the flow rate. The provision of a holding chamber for treated liquid which is connected to the dissolution chamber incorporates a gas volume that automatically adjusts for pressure differences and enables the liquid level in the dissolution chamber as well as the concentration of the agent in the treated liquid to be pressure independent. The holding chamber in turn is connected to a point of slightly decreased pressure in the main circuit.

20 Claims, 5 Drawing Figures

FEEDER ASSEMBLY FOR ADDING DISSOLVABLE AGENT TO A FLOWING LIQUID

FIELD OF INVENTION

The present invention relates to a feeder assembly for adding a dissolvable agent to a flowing liquid, whereby said liquid is brought into controlled contact with said agent in solid form, such that it is dissolved in said liquid in controlled manner. The invention further relates to a method of adding a solvable agent in controlled manner to a flowing liquid whereby the liquid is brought into contact with said agent in solid form and whereby the final concentration of the agent in the liquid is independent from the flow rate and the pressure of this liquid.

BACKGROUND OF INVENTION

U.S. Pat. No. 3,595,786 discloses an apparatus for treating fluids whereby a tabular treating agent is stacked in tubes suspended in a container through which the fluid is passed. The container comprises a manually adjustable weir which provides the desired height of the liquid level in the part of the container comprising the tubes with the treating agent. These tubes comprise at their lower ends axial slots through which the liquid may contact the treating agent, whereby an amount of the latter corresponding to the height of the liquid level in the container is contacted by the liquid.

This apparatus is designed for adjusting the liquid level in the container according to the flow rate of the liquid under more or less pressureless conditions such as used for sewage treatment. Variations of the pressure would add a further parameter influencing the liquid level in the container which can not automatically be compensated by a once adjusted weir. Thus the concentration of the treating agent in the liquid would depend on the pressure of the liquid. Further the simple shape of the weir does not guarantee a proportional relationship between the flow rate and the liquid level within the dissolution chamber over a wide range.

U.S. Pat. No. 4,293,425 discloses a device for chlorinating water of a swimming pool. A pump feeds water from the pool to a filter and back into the pool and the chlorinating device is arranged such that water coming from a point in the filter-pump circuit having elevated pressure enters a chamber in which it contacts and gradually dissolves pieces of chlorinating material and leaves the chamber to be fed back to the circuit at a point having a lower pressure. The chlorinating chamber is gas-tight, such that incoming water compresses the air entrapped in the chamber and the water is forced out from this chamber by the re-expanding air when operation of the pump is interrupted.

The amount of chlorinating material which is contacted by the water, pressed into the chlorinating chamber against the resistance of the air entrapped therein and thus the amount of dissolved material is dependent on the pressure of the incoming water since the height of the liquid level in the chamber depends thereon. Such devices may therefore not be used for liquid circuits which operate under variable pressure.

Other systems are known such as hydraulic ejectors which use the principle of a spray jet producing a pressure drop within a chamber which it traverses, thereby sucking in a fluid provided from a second supply conduit. Such ejectors produce a significant pressure drop in the main flow and additionally, the amount of agent sucked in from the second supply conduit depends on the pressure in the main flow which is not necessarily proportional to the flow itself. Moreover, this kind of system may only be used when the agent to be added to the main flow is in liquid condition.

Further, systems are known which use pumps for the side stream passing the dissolution chamber, whereby the operation of the pump may be controlled to provide constant concentration of the dissolvable agent in the main flow. Such systems, however, are expensive, consume energy and comprise a variety of moving parts which need regular maintenance.

OBJECT OF INVENTION

It is one object of the invention to provide a feeder assembly for adding dissolvable agents to a flowing liquid under pressure and which is subject to frequent and substantial variations of the pressure as well as the flow rate.

It is another object of the invention to provide a feeder assembly which automatically adjusts for such pressure variations in the liquid.

It is a further object of this invention to provide a feeder assembly as mentioned above which comprises no moving parts and which assures dry maintenance of the dissolvable material during periods of zero flow rate.

It is a still further object of the present invention to provide a feeder assembly which may be fitted or easily retro-fitted into a pressure fluid-circuit as a by-pass system, capable of working under a pressure similar to that of the main fluid-circuit.

It is also an object of the present invention to provide a method for controlled addition of a dissolvable agent to a flowing liquid, which method allows to maintain constant concentration of this agent in the main flow independently from variations in the pressure or the flow rate of the main circuit, and which does not incur additions to the main circuit of liquid which is highly saturated with dissolved agent after periods of zero flow rate.

DISCLOSURE OF INVENTION

The above and other objects of the invention are obtained by a feeder assembly for adding a dissolvable agent to a flowing liquid, whereby said liquid is brought into controlled contact with said agent in solid form such that it is dissolved in said liquid in controlled manner, the feeder assembly comprising a feed conduit connectable to a main liquid conduit comprising a pressure-difference creating device such as a flow restricting orifice providing a high pressure zone and a low pressure zone, the feed conduit leading from said high pressure zone to a dissolution chamber in which the liquid is brought into controlled contact with said dissolvable agent, said dissolution chamber being connected to a holding chamber for the liquid containing dissolved agent; a discharge conduit leading from the holding chamber to said low pressure zone of the main conduit; wherein said holding chamber comprises means for compensating variations of the pressure in the main conduit.

The last mentioned of the above objects is obtained by a method of adding a solvable agent in controlled manner to a flowing liquid whereby the liquid is brought into contact with said agent in solid form and whereby the final concentration of the agent in the liquid is independent from the flow rate and the pressure of the liquid, comprising the steps of: providing in a main flow of said liquid a pressure reducing device providing a high pressure zone and a low pressure zone therein; establishing a proportional side flow of said main flow leading to a dissolution chamber in which the liquid is brought into controlled contact with said dissolvable agent such that an amount of said agent proportional to said main flow is contacted by and dissolved in said liquid; and leading said side flow containing dissolved agent to a pressure compensating holding chamber and through a discharge conduit back to the low pressure zone of said main flow.

The compensating means may comprise a gas volume above the liquid level in the holding chamber being expandible or compressible according to variations of the liquid level in said holding chamber which is due to variations of the pressure in the main liquid-conduit. The gas volume of the holding chamber is interconnected with the liquid-free volume of the dissolution chamber and the total gas content of the holding chamber together with the liquid free volume of the dissolution chamber is dimensioned such that under maximum permitted pressure it is at least as big as the liquid-free volume of the dissolution chamber in drained condition.

Controlled dissolution of said agent in the sense of providing constant concentration thereof in the main flow may be obtained by controlling the liquid level in the dissolution chamber such that the higher the liquid level, the more of the dissolvable agent is contacted by and dissolved in the liquid. The liquid level may be controlled by a proportional weir at the downstream end of the dissolution chamber, regulating the liquid level in the dissolution chamber between a maximum flooded and a drained condition such that it is proportional to the flow rate, whereby the slope of the proportional weir can preferably be designed such that its width x at a given level y follows the formula $x = k \cdot y^{-31}$ 0.5, k being a constant depending on the desired factor of proportionality between the flow rate through said dissolution chamber and the liquid level therein.

The dissolution chamber may be comprised of a container, containing a side wall thereof designed as said proportional weir. The dissolution chamber may further comprise at least one feed tube containing said solid agent. The feed tube or tubes comprise vertical, axial slot or equivalent opening at its lower end through which said liquid may contact the solid agent to an extent corresponding to the liquid level in the dissolution chamber.

To provide undisturbed, smooth flow around the feed tubes the dissolution chamber may comprise one or more baffles provided to diffuse the liquid flow between the entry of the feed conduit and the feed tubes.

To adjust a constant ratio of desired level between the amount of liquid flowing through the main conduit and the liquid flowing through the dissolution chamber, the feed corduit may comprise an adjustable flow regulation valve. The feed conduit and the discharge conduit may also comprise stop valves.

In a compact embodiment of the invention the holding chamber is comprised within a tank which is closed at its top by the container of said dissolution chamber.

For proper adjustment of the gas volume in the holding chamber the tank may comprise an essentially vertical interior control tube, its lower end being connected to an outlet valve, the top opening of said control tube being positioned at a relative height within the tank essentially corresponding to the liquid level in said tank at ambient pressure.

In order to assure that the dissolvable agent is kept dry when the main flow is zero, the gas volume may be designed such that under maximum operation pressure the liquid level in the holding chamber is slightly below the lower end of said slots in the feed tubes of the dissolution chamber.

The feed tubes have a gas-tight detachable top cover which may be opened to add new agent.

For properly adjusting the liquid level in the dissolution chamber to be proportional to the flow rate, the linear weir may comprise a specifically designed shape. Thus it may be an essentially vertical slot having a cross section progressively broadening from its top end to its bottom end, whereby the bottom end is located at an absolute hight not beyond the lower end of the slots in the feed tubes, thus permitting to discharge from the dissolution chamber all liquid beyond the bottom level of stacked dissolvable agent within the feed tubes when the liquid flow in the main conduit and accordingly in the feed conduit is zero.

The holding chamber may be devided up into a first and a second, separated tank, the first tank being integral with the dissolution chamber, whereby each tank has a gas volume above its liquid level and the liquid levels in each tank are essentially at the same absolute height and all separated tanks may be interconnected by liquid-conduits entering the tanks below the liquid level as well as by gas conduits entering the tanks above the liquid level.

The second tank may be subdivided into an upper and a lower tank which are interconnected by a liquid conduit connecting the bottom of the upper tank with the top of the lower tank. The volume of the tanks may be designed such that the liquid level within the combination of upper and lower secondary tanks under ambient pressure and without liquid flow is situated within the lower tank and at operating pressure under maximum and minimum liquid flow within the upper tank.

In the embodiment comprising one tank only, this tank may be designed with a horizontal or vertical main dimension.

The above method of adding a dissolvable agent to a flowing liquid may comprise passing the side flow after the dissolution chamber through a linear weir providing a liquid level in the dissolution chamber which is proportional to said main flow.

During its passage through the holding chamber the liquid may be brought into contact with a gas volume which is expanded or contracted according to the pressure of the liquid.

The above method is specially advantageous when means are provided to keep the dissolvable agent dry during periods where the flow rate is zero. This may be obtained by automatically discharging the dissolution chamber of all liquid beyond the level of the bottom end of the linear weir and, thus, beyond the lower end of the stacked agent in the feed tubes when the liquid flow is zero.

BRIEF DESCRIPTION OF THE DRAWINGS

The invention is in the following described in more detail with reference to the drawing, wherein.

DETAILED DESCRIPTION OF THE DRAWINGS

Figure 1:
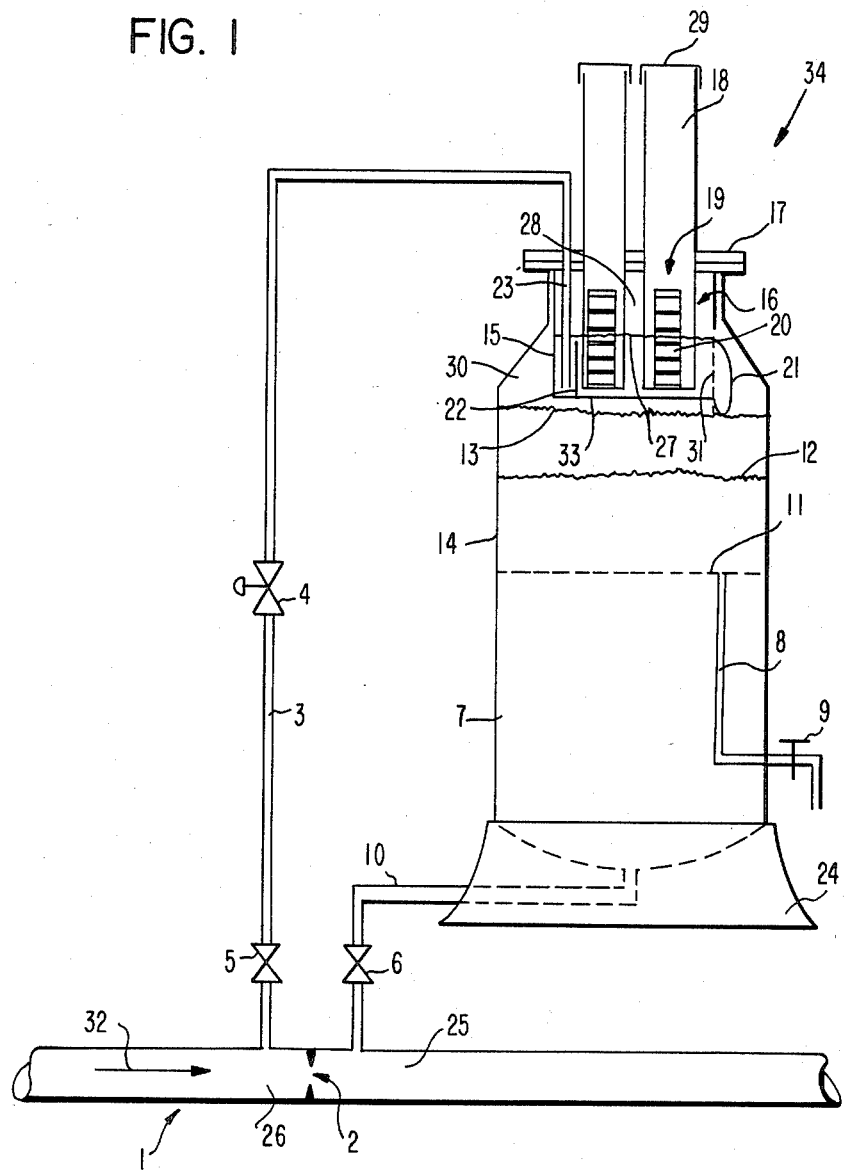
FIG. 1 shows a schematic view of an embodiment of the invention having a holding chamber with one single, vertical tank.

With reference to FIG. 1 a feeder assembly according to the present invention is connected to a main liquid-conduit 1 having a pressure reducing device 2 such as a choke, a cross-section reducing orifice or the like, which creates a zone 26 of increased pressure and a zone of reduced pressure provided that the liquid in this main conduit flows in the direction of arrow 32.

A feed conduit 3 being connected to the high pressure zone 26 leads to the pressure feeder unit generally designated with 34. This feed conduit comprises a stop valve 5 and a regulation valve 4 and its end portion 23 enters the pressure feeder 34. The pressure feeder is comprised of a tank 14 resting on a foot 24 and a dissolution chamber 16. The latter comprises a container 15, a top plate 17, a bottom plate 33, a baffle 22, a linear weir 31 and feed tubes 18, having gas-tight top covers 29 and vertical, axial slots 19 at their lower ends. The feed tubes 18 contain stacked tablets 20 of an agent to be dissolved in the liquid flowing through the dissolution chamber 16 whereby the height of the liquid level therein is indicated with reference number 27 by way of example. Above the liquid level 27, reference number 28 designates a liquid-free gas volume.

The tank 14 comprises a holding chamber 7 being partially filled with liquid containing dissolved agent up to a liquid level between the designated lowest and highest permitted operation level 12 and 13 respectively. The tank further comprises a control tube 8, having its top opening at a relative level 11. The lower end of the control tube is connected with an outlet valve 9.

Finally the lowest part of the tank 14 is connected by a return tube 10 to the low pressure zone 25 of the main conduit 1. The return tube 10 comprises a stop valve 6.

Figure 4:
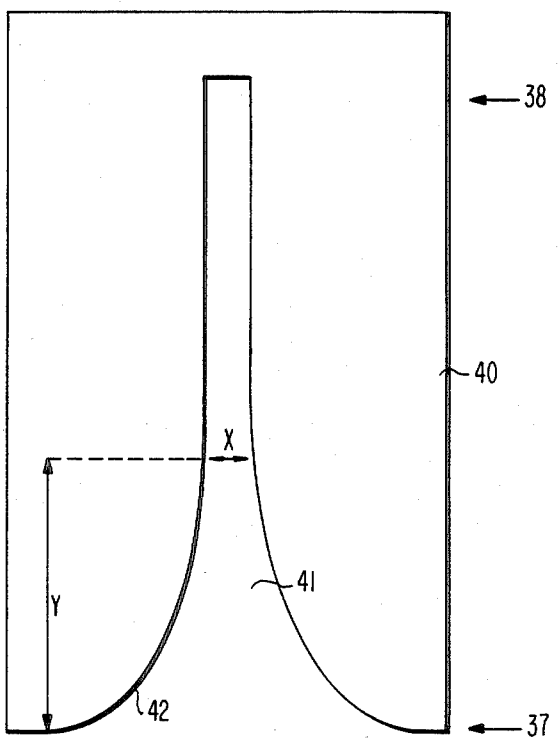
FIG. 4 shows the one cross-section for a proportional weir.

The assembly as described in its components works in the following way:

A by-pass of the liquid flowing through main conduit 1 is separated from the high pressure zone 26 thereof and enters feed tube 3, provided that the stop valve 5 is open. The flow rate within this by-pass is proportional to the flow rate in the main conduit which, by hydrodynamic law, creates a pressure drop across the choke 2 that is proportional to the flow rate therethrough. This pressure drop is also the flow rate determining factor for the by-pass. The factor of proportionality between the flow rates in the main conduit and the feed conduit respectively may be adjusted by the regulation valve 4. Liquid pouring into the dissolution chamber 16 through the end portion 23 of the feed conduit 3 builds up a certain liquid level 27 primarily depending on the flow rate of the liquid in feed duct 3. This liquid level is maintained as equilibrium between the incoming flow from the feed conduit 3 and the amount of liquid which is released from the dissolution chamber through the linear weir. The slope of the cross-section of this weir along its vertical extension being such, that the liquid level 27 in the dissolution chamber is installed automatically at a relative height proportianal to the flow rate of the liquid through the dissolution chamber which in turn is proportional to the flow rate in the main conduit. A linear weir providing this effect is shown in Fig. 4 below.

As described above, the feed tubes 18 containing the stacked tablets of agent to be dissolved in the liquid passing through the dissolution chamber comprise at their lower ends axial, vertical slots 19 displaying parts of the stacked tablets 20. The feed tubes ar gas-tightly closed by their top covers 29 which may be removed under certain conditions as set out below to supply new tablets 20.

An amount of these tablets proportional to the liquid level in the dissolution chamber is thus contacted by and dissolved in the liquid such that the total amount of agent being dissolved is proportional to the flow rate in the main conduit 1. In order to avoid turbulent flow in the dissolution chamber which may lead to uncontrolled dissolution of agent, the liquid is forced to pass over a baffle 22 or the like which diffuses the flow and smoothens the liquid level.

So far, all operational components have been described which are necessary to obtain a proportional relationship between the amount of dissolved agent and the flow rate in the main tube if all other flow parameters were assumed to be constant. The liquid containing the dissolved agent may in this case be simply lead back to the low pressure zone 25 of the main conduit.

This feeder assembly, however, is proposed to operate in hydrodynamic systems of variable pressure such as potable water circuits wherein the concentration of treating agent must remain independent not only from the flow rate but also from the pressure.

To obtain this independency from the pressure, the liquid leaving the dissolution chamber 16 flows down through the linear weir in a stream 21 into a holding chamber 7 comprising a liquid body up to a level between the above mentioned lowest and highest levels 12 and 13, whereby the actual level is established according to the pressure of the system. To this end, a gas-volume 30 above the liquid body of the holding chamber is compressed corresponding to the pressure in the by-pass system—which is proportional to the pressure in the main conduit—such that under maximum permitted pressure the liquid level reaches its highest position 13 which is kept slightly below the bottom plate 33 in order to allow proper discharge of the dissolution chamber in case of zero flow rate. The lowest level may be installed somewhere between the highest level and level 11. If the gas-volume 30 would not exist to compensate for variations of the pressure, the liquid free volume 28 in the dissolution chamber would be compressed or expanded according to the actual pressure and would, thus, cause the liquid level 27 in the dissolution chamber to vary with the pressure. With the existence of the gas-volume in the holding chamber only the liquid level in the holding chamber varies with the pressure and permits therefore to maintain the liquid level in the dissolution chamber in its proportional relationship with the flow rate only.

Naturally, the pressure of the gas-volume in the dissolution chamber varies with the above variations of the pressure in the main conduit, but this does not have a significant effect on the dissolution rate of the agent in the feed tubes.

Refilling of the feed tubes with new tablets may be carried out as follows: prior to opening the top covers 29 the entire feeder by-pass system needs to be de-pressurized. To this end the two stop valves 5 and 6 may be closed to separate the by-pass completely from the main conduit and then valve 9 may be opened. All liquid in the holding chamber above level 11 is discharged thereby. Level 11, i.e. the top end of control tube 8 and the gas content of the gas-volume are designed such, that the gas volume 30 above the liquid body in the holding chamber under ambient pressure extends down until level 11. Thus upon opening of the valve 9 all liquid above level 11 should be pressed out of the tank under the force of the expanding gas.

Once ambient pressure is installed within the feeder, the top covers 29 may be be opened, new tablets inserted into the feed tubes and the covers closed again. After closing of valve 9, stop valves 5 and 6 may be re-opened and the system will come under operating pressure through liquid entering the tank by feed conduit 3.

Alternatively to opening the valve 9 valve 6 may be closed after the closing of valve 5, whereby the liquid level in the holding chamber may be decreased by liquid leaving the tank to be led into the main conduit. However, in this case, means must be provided which indicate when the liquid level in the chamber reaches level 11.

Figure 2:
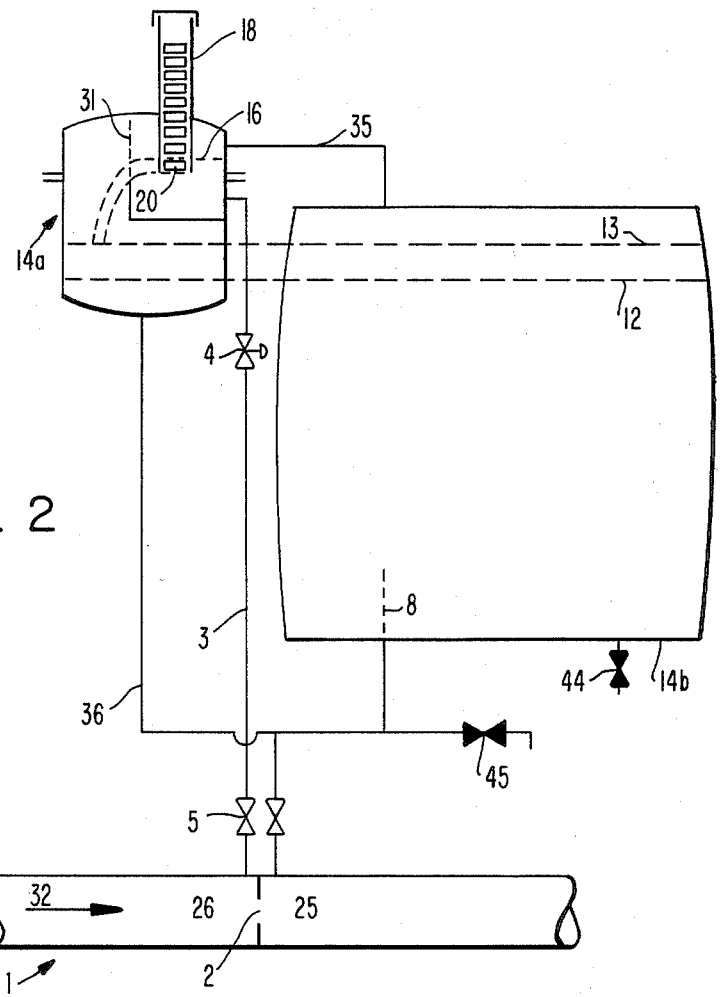
FIG. 2 shows another embodiment of the invention having a holding chamber with a primary and one secondary tank.

FIG. 2 illustrates a modified embodiment of the present invention whereby components similar to those of FIG. 1 are designated with identical reference numbers.

In a main liquid conduit 1 having a choke 2 for creating a pressure difference between the high pressure zone 26 and the low pressure zone 25, liquid flows in the direction of arrow 32. A by-pass is established by feed conduit 3 having a stop valve 5 and a regulation valve 4, the liquid flowing into dissolution chamber 16, integral part of tank 14a. The dissolution chamber comprises in principle the same components as in FIG. 1, but only one feed tube 18 and the linear weir of which are indicated in FIG. 2. The feed tube need not reach the bottom of the dissolution chamber, but the lower end of the linear weir must be located at the same level as the bottom surface of the lowest tablet 20 in order to assure that the tablets are wetted as soon as the liquid level rises above the weir but also that the tablets stay dry as soon as the flow is zero.

Tank 14a already contains a part of the liquid comprising dissolved agent and is connected with a large tank 14b containing the bulk of such liquid, such, that the liquid level in both tanks, 14a and 14b, are on the same absolute height, as indicated by the dashed lines 12 and 13 representing the liquid level at maximum and minimum flow respectively. The control tube 8 serves the same purpose as in FIG. 1, the top of which determines the gas content of the volume above the liquid level in tank 14b.

In order to warrant that the liquid levels in both tanks are the same, tanks 14a and 14b are interconnected by a gas conduit 35, safely positioned above any eventual liquid level and a liquid conduit 36 connecting both tanks below the liquid level. Thus safe control of the liquid level in the lower part of tank 14a may be guaranteed. Tank 14b may be chosen of suitable dimensions in order to provide a stored volume of agent containing liquid as desired.

Figure 3:
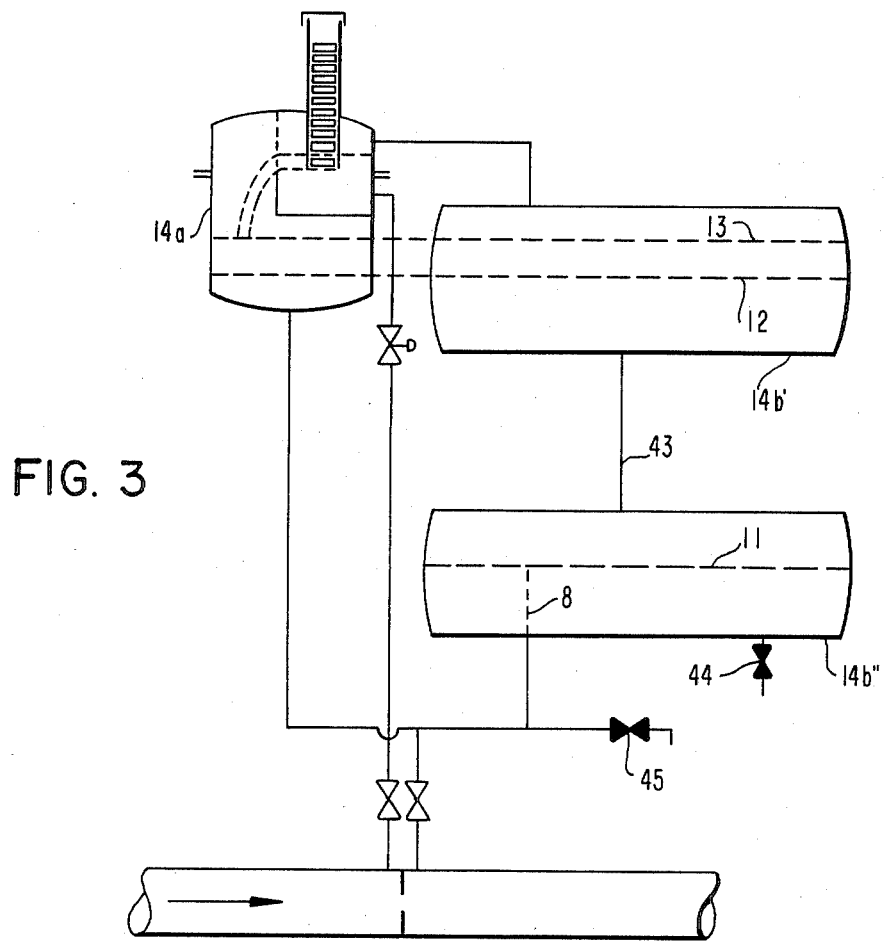
FIG. 3 shows an embodiment similar to FIG. 2 having the second tank subdivided into an upper and a lower tank.

FIG. 3 illustrates an embodiment of the invention similar to FIG. 2 wherein the second tank 14b is subdivided into two sub-tanks 14b' and 14b'', whereby the gas volume is designed such, that the liquid level varying from level 12 at maximum flow rate to level 13 at minimum flow rate respectively is located within the upper tank 14b' and the liquid level 11 under ambient pressure of the system is located within the lower tank 14b''. Accordingly, the control tube 8 need to extend only into the lower tank 14b''.

Advantages of a system with several tanks over a one tank system are e.g. that no agent containing liquid need to be spilled when the feed tubes are opened for re-feeding of tablets, or that the influence of pressure variations on the liquid level may be dampened. Also in cases where little space is available, the dissolution chamber may be located closer to the main conduit and the holding chamber may be arranged where more space is available.

FIG. 4 shows the shape of the linear weir as described under FIG. 1. Section 40 of this weir represents a wall portion closing the dissolution chamber and section 41 is an opening of varialble cross-section along the vertical extension of the weir. The slope 42 of this weir between a level 37 corresponding to the lower end of the feed tubes and level 38 corresponding to the upper limit of the slots 19 (FIG. 1) in the feed tubes is calculated such that the amount of liquid passing the slot 41 of the weir is exactly proportional to the hydrodynamic height of the liquid banked up behind the weir. Thus, the liquid level in the dissolution chamber is automatically adjusted in proportion to the flow rate.

It is to be understood, that other shapes of weirs may be envisaged keeping in mind only that the liquid level in the dissolution chamber should be established therewith at a height proportional to the flow rate therethrough. For applications of moderate sensibility which may tolerate a certain degree of deviation from the constant concentration of agent dissolved in the liquid, weirs of e.g. triangular shapes may be used introducing an error which may be acceptable. Also weirs of non-continuous shapes, e.g., having a step-like slope may be used in such cases.

Figure 5:
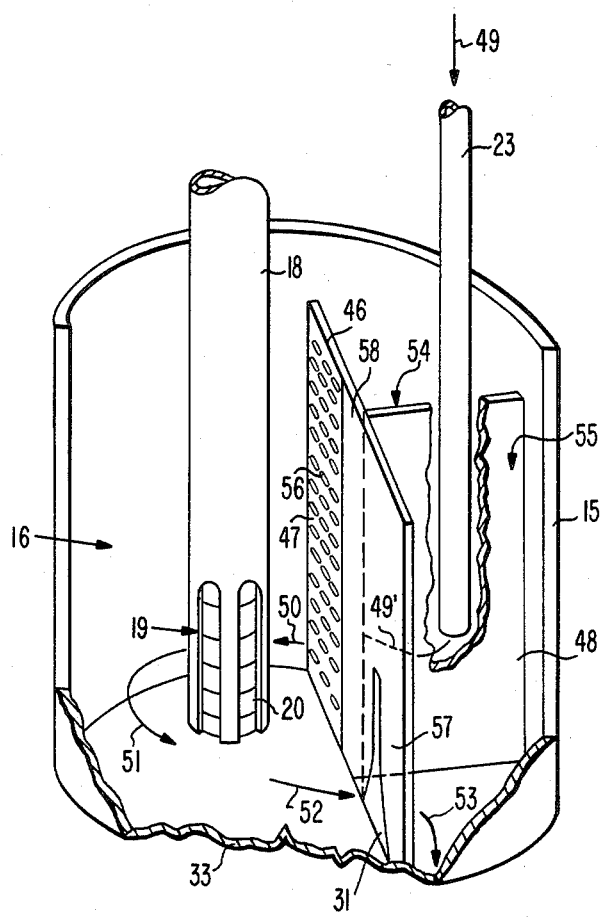
FIG. 5 shows a perspective view of a container comprising the dissolution chamber.

FIG. 5 shows a perspective view of a preferred embodiment of the dissolution chamber, wherein parts which are identical to those already described previously are designated with the same reference numbers as before.

In a cylindrical container 15 encompassing the dissolution chamber 16 are arranged the end 23 of the feed conduit (reference number 3 in FIG. 1) connecting the container 15 with a main conduit (not shown). A feed tube 18 comprising stacked tablets 20 which are acceissible through openings 19, is provided within the dissolution chamber 16 such that the feed tube 18 is in contact with the bottom plate 33 of the container 15.

The container 15 is subdivided into three sections by means of partitions 46 and 48 such that the end 23 of the feed conduit is located in an entry compartment 54. This entry compartment 54 is delimited by a portion 47 of a main partition 46, by partition 48 and by the adjacent portion of the side wall of the container 15. Portion 47 of main partition 46b comprises a plurality of small openings 56 which serve to diffuse liquid passing from the entry compartment 54 into the dissolution chamber 16.

The perforated portion 47 of main partition is located near the side wall of the container. Portion 58 of the main partition is impermeable.

The other portion 57 of the main partition comprises the proportional weir 31 and delimits—together with partition 48 and the adjacent part of the side wall of container 15—an exit compartment 55. Contrary to the entry compartment 54 and the dissolution chamber 16, the exit chamber 55 has an open bottom, that is, the bottom plate 33 of container 15 is open in the area of the exit compartment 55.

As indicated by arrows 49, 49', and 50-53, liquid enters the entry compartment through the end 23 of the feed conduit, passes through the perforated portion 47 of the main partition 46, washes around the lower end of the feed tube 18 and leaves the dissolution chamber through weir 31 to fall into a holding chamber (not shown) beneath container 15.

As indicated by the above arrows, the entire flow of the liquid through container 15 follows a circular pattern assisted by the outwards location of the perforated portion 47 of the main partition 46. This circular flor offers specific advantages, e.g., with respect to low pressure drop along the bypass, compact construction, high degree of constance of dissolution rate of the tablets 20 and others.

The function of the proportional weir and the proportionality between liquid level in the dissolution chamber, flow rate and final concentration of agent in the main conduit has been discussed with reference to previous Figures already and may be omitted here.

EXAMPLE

A prototype according to the assembly of FIG. 1 has been prepared comprising the following measurements:
Diameter of the tank: 11.37 inches (28 cm)
Maximum operating pressure: 60 psig (4.2 atm)
Minimum operating pressure: 40 psig (2.8 atm)
Tank height: 52 inches (128 cm)
Height of dissolution chamber: 6 inches (15 cm)
Gas height at maximum pressure: 11.4 inches (28.4 cm)
Distance from bottom plate of dissolution chamber to level 11: 52 inches (128 cm)
Number of feed tubes 1

The liquid level in the tank being 5.4 inches below the bottom plate 33 at maximum pressure of 60 psi sank 4.2 inches at operation of 40 psi.

By way of example the pressure drop of the choke for a 58 psi (3.9 atm) water pipe of 2 inches diameter, the choke reducing this diameter to 1.00 inches (2.5 cm), is in the order of 1.5 psi (0.10 atm) at a flow rate of 30 gallons (137 l) per minute.

The agreement between the design and actual operation was evaluated in the prototype pressure feeder with the main line discharge and the pump suction connected to a tank at atmospheric pressure to create a closed loop system.

The system and operating parameters were set as indicated previously. In addition, the following parameters were set; system volume 100 gas., mainstream flow rate 30 gal/min., and bypass flow rate 3.25 gal/min.

A weir such as shown in FIG. 4 was used, having a maximum lower opening of 1.5 inches and aperture height of approximately 2.5 inches. The weir was calibrated and found to produce a liquid level of 1.6 inches at 3.25 gal/min. The dissolve rate of the $Cl_2$ tablets used for the test had previously been determined to be 6.23 g/hr. giving an expected dose rate of 10.9 g/hr. Three 75% chlorine tablets were placed in the pressure feeder. It was started and run for 2 hours 45 minutes at 58 psig.

Over this period, theoretically 30 grams of tablets should dissolve increasing the system $Cl_2$ concentration by 59 ppm.

At the end of the run the $Cl_2$ concentration was measured at 67.4 ppm. Deducting the initial $Cl_2$ concentration of 7.1 ppm gives a net increase of 60.3 ppm, or a 2.2% deviation. The actual weight loss was 29.8 grams for a deviation of 0.7%.

The $Cl_2$ concentration vs. time profile was evaluated to determine how consistent the $Cl_2$ feed rate was. For the ten points of data, the average feed rate was 0.148 g/min.

This example shows good agreement between the expected and actual performance. Longer term runs with varying flow and pressure are in progress.

The material for the prototype tank was PVC. However, other materials such as FRP, GRP, FED, PVC etc. may be used for the tanks as well as for the piping. The mechanical data of these materials are well known so that the materials may be chosen according to the pressure ranges under which the feeder should operate.

A pressure feeder according to the present invention may be usef for pressurized circuits of drinking water, but also for pressurized circuits of waste-water, process-water, cooling tower water, boiler water and the like, and generally for all kind of applications where a constant concentration of any soluble agent in a liquid circuit of constant or variable pressure is required.

What is claimed is:

1. A pressure feeder assembly for adding a controlled dissolution of a dissolvable agent to a flowing liquid, whereby said liquid is brought into controlled contact with said agent in solid form, such as to dissolve agent in said liquid in controlled, proportional manner, the feeder assembly comprising:
   a feed conduit connectable to a main liquid conduit comprising a pressure-difference creating device such as a flow restricting orifice providing a high pressure zone and a low pressure zone, the feed conduit leading from said high pressure zone to
   a dissolution chamber in which the liquid is brought into controlled contact with at least one feed tube containing stacked tablets of solid dissolvable agent; said dissolution chamber having
   a linear weir regulating the liquid level in the dissolution chamber between a maximum flooded and a drained condition such that the liquid level is proportional to the liquid flow rate, said linear weir connecting said dissolution chamber with
   a holding chamber for the liquid containing dissolved agent;
   a dischange conduit leading from the holding chamber to said low pressure zone of the main conduit; wherein
   said holding chamber comprises means for compensating variations of the pressure in the main conduit.

2. The assembly of claim 1, wherein said compensating means comprises a gas volume above a liquid level in the holding chamber being expandable or compressible according to variations of said liquid level due to variations of the pressure in said main conduit, the gas volume of the holding chamber being interconnected with a liquid-free volume of the dissolution chamber, said gas volume of the holding chamber together with the liquid free volume of the dissolution chamber being dimensioned such that the total gas volume under maximum permitted pressure is at least as big as the liquid-free volume of the dissolution chamber in drained condition.

3. The assembly of claim 1, wherein said dissolution chamber is comprised within a container, partitions within said container delimiting a entry compartment, said dissolution chamber and an exit compartment, wherein a portion of said partitions separates the entry compartment from the dissolution chamber and has flow diffusing capabilities, and another portion of said partitions separates the dissolution chamber from the exit compartment and comprises said proportional weir, and wherein the dissolution chamber comprises at least one feed tube containing said solid agent, the feed tube(s) comprising a vertical, axial slot at their lower ends through which said liquid may contact the solid agent to an extent corresponding to the liquid level in the dissolution chamber.

4. The assembly of claim 3, wherein the dissolution chamber comprises a baffle provided to diffuse the liquid flow between the entry of the feed conduit and the feed tube(s).

5. The assembly of claim 3, wherein the feed conduit comprises a flow regulation valve for adjusting a desired, constant ratio between the flow of liquid in the main conduit and the flow through the dissolution chamber.

6. The assembly of claim 5, wherein the feed conduit and the discharge conduit comprise stop valves.

7. The assembly of claim 3, the feed tubes having a gas-tight detachable top cover.

8. The assembly of claim 3, the linear weir being an essentially vertical slot having a cross section broadening from its top end to its bottom end, the bottom end being located at an absolute height not beyond the lower end of the slots in the feed tubes, thus permitting to discharge from the dissolution chamber all liquid beyond the bottom level of stacked dissolvable agent within the feed tubes when the liquid flow in the main conduit and accordingly in the feed conduit is zero.

9. The assembly of claim 2, wherein the holding chamber is comprised of a first and a second, separated tank, each tank having a gas volume above its liquid level, the liquid levels in each tank being essentially at the same absolute height.

10. The assembly of claim 9, wherein all separated tanks are interconnected by liquid conduits entering the tanks below the liquid level and by gas conduits entering the tanks above the liquid level.

11. The assembly of claim 9, wherein the second tank is subdivided in an upper and a lower tank being interconnected by a liquid conduit connecting the bottom of the upper tank with the lower tank, the liquid level under ambient pressure and without liquid flow being situated within the lower tank and at operating pressure under maximum and minimum liquid flow within the upper tank.

12. The assembly of claim 1, wherein the holding chamber is comprised within a tank which is closed at its top by the container of said dissolution chamber.

13. The assembly of claim 12, wherein said tank comprises an essentially vertical interior control tube being connected with an outlet valve, the top opening of said control tube being positioned at a relative height within the tank essentially corresponding to the liquid level in said tank at ambient pressure.

14. The assembly of claim 13, the gas volume being designed such that under maximum operation pressure the liquid level in the holding chamber is slightly below the lower end of said slots in the feed tubes of the dissolution chamber.

15. The assembly of claim 12, wherein said tank comprises a vertical main dimension.

16. The assembly of claim 12, wherein said tank comprises a horizontal main dimension.

17. A method of adding a solvable agent in controlled manner to a flowing liquid whereby the liquid is brought into contact with said agent in solid form and whereby the final concentration of the agent in the liquid is in a proportional manner inedependent from the flow rate and the pressure of the liquid, the method comprising the steps of:
  providing in a main flow of said liquid a pressure reducing device providing a high pressure zone and a low pressure zone therein;
  establishing a proportional side flow of said main flow leading to a dissolution chamber in which the liquid is brought into controlled contact with stacked tablets of dissolvable agent contained within a feed tube, said controlled contact being such that an amount of said agent proportional to said main flow is contacted by and dissolved in said liquid;
  passing said side flow from within said dissolution chamber through a linear weir providing a liquid level in the dissolution chamber which is proportional to said main flow; and
  leading said side flow containing dissolved agent from said linear weir to a pressure compensating holding chamber and through a discharge conduit back to the low pressure zone of said main flow.

18. The method of claim 17, wherein the liquid passing the holding chamber is brought in contact with a gas volume which is expanded or contracted according to the pressure of the liquid.

19. The method of claim 17, wherein the dissolution chamber is automatically discharged of all liquid beyond the level of the bottom end of the linear weir when the liquid flow is zero.

20. The method of claim 17, wherein the main flow is a pressurized drinking water conduit.

* * * * *